US006801281B2

(12) United States Patent
Huang et al.

(10) Patent No.: US 6,801,281 B2
(45) Date of Patent: Oct. 5, 2004

(54) SINGLE CELL GAP TRANSFLECTIVE LIQUID CRYSTAL DISPLAY WITH SLANTED REFLECTOR ABOVE TRANSMISSIVE PIXELS

(75) Inventors: Yi-Pai Huang, Orlando, FL (US); Xin-Yu Zhu, Orlando, FL (US); Shin-Tson Wu, Oviedo, FL (US); Han-Ping Shieh, Hsin Chu (TW)

(73) Assignees: University of Central Florida, Orlando, FL (US); Toppoly Optoelectronics Corp (TW)

( * ) Notice: Subject to any disclaimer, the term of this patent is extended or adjusted under 35 U.S.C. 154(b) by 0 days.

(21) Appl. No.: 10/430,019

(22) Filed: May 5, 2003

(65) Prior Publication Data
US 2003/0210366 A1 Nov. 13, 2003

Related U.S. Application Data
(60) Provisional application No. 60/378,304, filed on May 6, 2002.

(51) Int. Cl.[7] .............................................. G02F 1/1335
(52) U.S. Cl. ...................... 349/113; 349/106; 349/114; 349/117
(58) Field of Search ........................... 349/68, 113, 106, 349/114, 122, 160; 359/245, 247, 833, 844

(56) References Cited

U.S. PATENT DOCUMENTS

| 5,280,375 A | 1/1994 | Tsuda et al. ................... 359/76 |
| 5,303,322 A | 4/1994 | Winston et al. .............. 385/146 |
| 5,528,720 A | 6/1996 | Winston et al. .............. 385/146 |
| 6,044,196 A | 3/2000 | Winston et al. .............. 385/146 |
| 6,118,503 A | 9/2000 | Oki et al. ....................... 349/65 |
| 6,256,447 B1 | 7/2001 | Laine .......................... 385/146 |
| 6,335,999 B1 | 1/2002 | Winston et al. .............. 385/146 |
| 6,621,543 B2 * | 9/2003 | Moon .......................... 349/115 |
| 2001/0018279 A1 | 8/2001 | Molsen ....................... 359/247 |
| 2001/0052948 A1 | 12/2001 | Okamoto et al. ............. 349/12 |
| 2003/0063243 A1 * | 4/2003 | Rosendaal et al. .......... 349/113 |

* cited by examiner

*Primary Examiner*—Toan Ton
*Assistant Examiner*—Tai Duong
(74) *Attorney, Agent, or Firm*—Brian S. Steinberger; Law Office of Brian S. Steinberger, P.A.

(57) ABSTRACT

Single cell gap transflective liquid crystal display which provides that the backlight traverses the reflective pixel portion twice and thereby follows a path similar to that of the ambient light. A slant reflector is built on the path of the back light to reflect the transmitted light to the reflective portion so that the back light and ambient light follow similar paths.

22 Claims, 9 Drawing Sheets

Fig. 1a
(Prior Art)
Fig. 1b
(Prior Art)
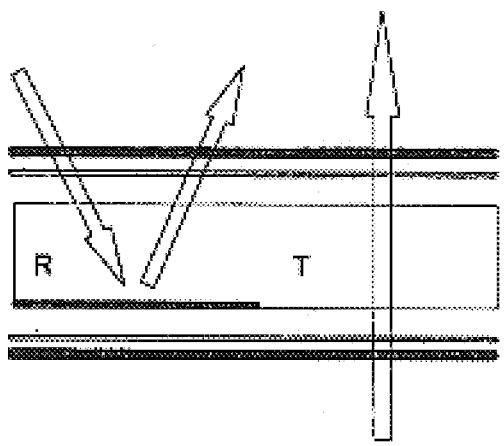
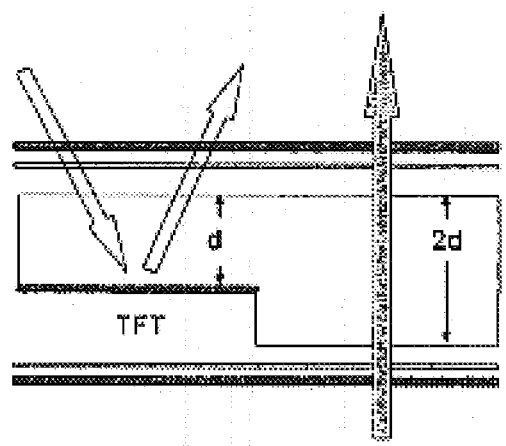
Fig. 2
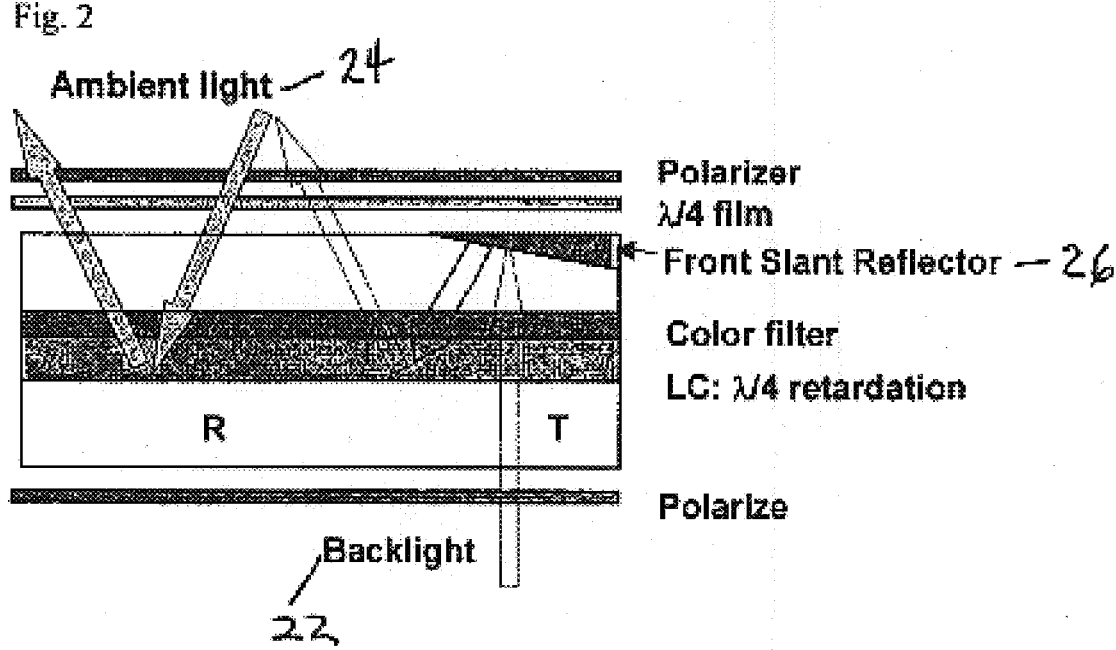

Fig. 3a
Fig. 3b
(Prior Art)
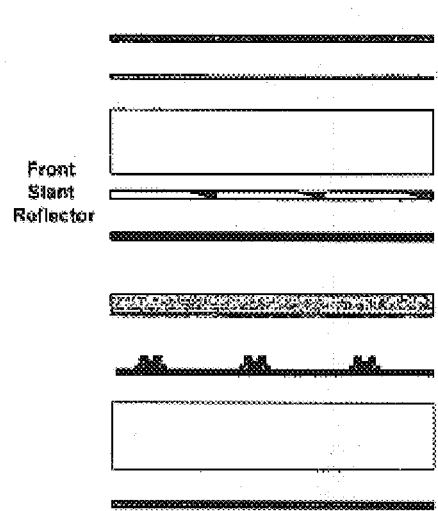
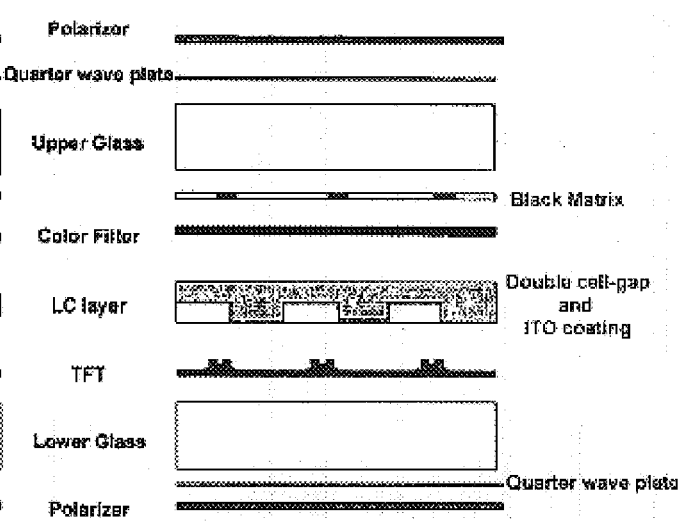
(a)
(b)
Fig. 4
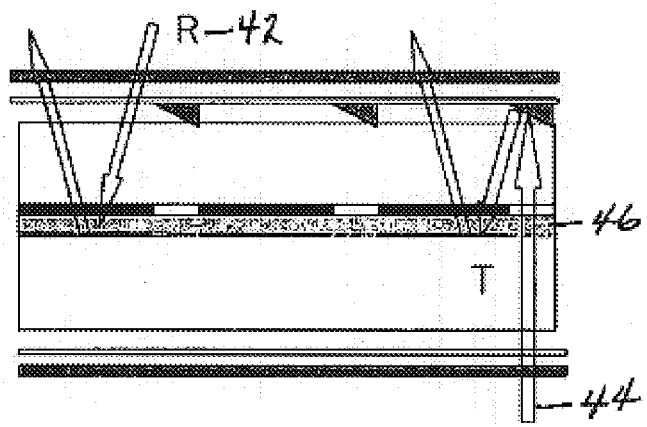

Black Matrix
52

54    54

Front Slant Reflector
56

Bright State at V=0

Dark State at V=ON

Dark State at V=0

Bright State at V=ON

SINGLE CELL GAP TRANSFLECTIVE LIQUID CRYSTAL DISPLAY WITH SLANTED REFLECTOR ABOVE TRANSMISSIVE PIXELS

This invention relates to transflective liquid crystal displays, and in particular to methods and apparatus for enhancing brightness of reflected and transmissive images in a single gap transflective liquid crystal display and claims the benefit of priority based on U.S. Provisional Application Serial No. 60/378,304 filed May 6, 2002.

BACKGROUND AND PRIOR ART

A transmission-type liquid crystal display (LCD) exhibits a high contrast ratio and good color saturation. However, its power consumption is high due to the need of a back light. At bright ambient, the display is washed out completely. On the other hand, a reflective LCD is using ambient light for reading displayed images. Since it does not require a back light, its power consumption is reduced significantly. However, its contrast ratio is lower and color saturation much inferior to those of the transmission type. At dark ambient, a reflective LCD lost its visibility.

U.S. Pat. Nos. 6,281,952 B1; 6,295,109 B1; 6,330,047 B1 each to Sharp describe conventional transflective light crystal displays, where each pixel is split into R (reflective) and T (transmissive) sub-pixels. The R and T area ratio can vary from 7:3 to 3:7, depending on applications. The transmissive display is used for dark ambient only in order to conserve power.

Two types of transflective LCDs have been developed: single cell gap (see FIG. 1a) and double cell gap (see FIG. 1b). In the single cell gap approach, the cell gap (d) for R and T modes is the same. The cell gap is optimized for R-mode. As a result, the light transmittance for the T mode is lower than approximately 50% because the light only passes the liquid crystal (LC) layer once. In the double cell gap approach, the cell gap is d and 2d for the R and T pixels, respectively. In this approach, both R and T have high light efficiency. However, the T mode has four times slower response time than that of the R mode.

A common problem for the above-mentioned approaches is that R and T pixels have different color saturation. For R pixels, the incident light passes through the color filter twice, but for T pixels light only passes the color filter once. As a result, their color saturation is different.

A search in the United States Patent Office of the subject matter of this invention (hereafter disclosed) developed the following five (5) U.S. patents and two (2) U.S. patent publications:

U.S. Pat. No. 5,280,375 to Tsuda, et al., U.S. Pat. No. 5,303,322 to Winston, et al. and U.S. Pat. No. 5,528,720 Winston, et al. all describe optical backlight systems for collecting light and outputting the light, and methods for fabricating a taped multilayer luminary device;

U.S. Pat. No. 6,044,196 to Winston, et al describes an optical device for operating on light from a source and for selectively outputting light to a viewer without concern for the LC structure;

U.S. Pat. No. 6,118,503 to Oki, et al. teaches the use of a polarized lift guide component to enhance the light efficiency by converting the polarization of the backlight;

U.S. Pat. No. 6,256,447 to Laine, et al describes a backlight apparatus for LCD use without concern for the LCD design;

U.S. Pat. No. 6,335,999 to Winston, et al describes an optical device for operating on light from a source and for selectively outputting or concentrating light to guide the LCD backlight;

Patent Publication 2001/0052948 to Okamoto, et al describes a LCD with the LCD element having a pair of substrates sandwiched about the LC layer of two different thicknesses and in which the thickness of the LC layer is thinner in the reflection section than in the transmission section; and, Patent Publication 2002/0018279 to Molsen, et al describes a light scattering transflector built on the bottom glass of the liquid crystal display panel with a special shape to direct and scatter the ambient light into the reflective region.

The above described common problem of the R and T pixels having different color saturation is not alleviated by the above documents found in the referenced patent search.

SUMMARY OF THE INVENTION

A primary objective of the invention is to provide a single cell gap transflective liquid crystal display (LCD) for enhancing brightness of reflected and transmissive images whereby high quality images are displayed when the ambient light sources are low.

A secondary objective of the invention is to provide a single cell gap transflective LCD that has simpler fabrication over double cell gap transflective LCDs.

A third objective of the invention is to provide a single cell gap transflective LCD having a cost benefit over prior devices since only one retardation film is needed.

A fourth objective of the invention is to provide a single cell gap transflective LCD that is compatible with present fabrication methods and does not involve extra time and costs that would be needed with new fabrication methods.

A fifth objective of the invention is to provide a single cell gap transflective LCD that can be applicable on different liquid crystal modes.

A sixth objective of the invention is to provide a single cell gap transflective LCD having a high area utilization.

A seventh objective of the invention is to provide a single cell gap transflective LCD having same response time in both the R and T regions.

An eighth objective of the invention is to provide a single cell gap transflective LCD having same color saturation effects.

Preferred embodiments of the invention includes both methods and apparatus for providing a single cell gap transflective LCD in which the methods include the steps of: providing a transmission portion and a reflection portion in the transflective LCD; and also providing a reflector of the back light in said transmission portion to said reflective portion whereby the reflected back light and ambient light follow similar paths and thereby improves the brightness of the reflected and transmissive images of the transflective LCD and the apparatus comprises: a transmission portion and a reflective portion in the transflective LCD; and a reflecting structure of several different shapes in the path of back light in the transmission portion to reflect transmitted light to the reflective portion so that the back light and ambient light follow similar paths whereby brightness of the reflected and transmissive images are improved.

Further objects and advantages of this invention will be apparent from the following detailed descriptions of presently preferred embodiments, which are illustrated schematically in the accompanying drawings.

BRIEF DESCRIPTION OF THE FIGURES

FIG. 1a is a view of a prior art transflective LCD with single gap.

FIG. 1b is a view of a prior art transflective LCD with a double gap.

FIG. 2 shows the transflective LCD of the invention with a slant front reflector having a single gap and single quarter-wave film.

FIG. 3a is a breakaway view of the transflective LCD of the invention with a front slant reflector.

FIG. 3b is a breakaway view of a prior art transflective LCD with double gap, double retardation film and black matrix at the gap interface.

FIG. 4 is a schematic plot for illustrating same color saturation in the novel transflective LCD of FIG. 3a.

FIG. 6b shows the homogenous transflective LC cell of FIG. 6a with Dark State at V=ON.

FIG. 7b shows a black transflective LCD of the invention employing a VA LC cell in Bright State at V=ON.

FIG. 8b shows a triangular shaped reflector for use with the LCD of FIG. 8a.

FIG. 8c shows a biprism shaped reflector for use with the LCD of FIG. 8a.

FIG. 8d shows a curved surface reflector for use with the LCD of FIG. 8a.

DESCRIPTION OF THE PREFERRED EMBODIMENTS

Before explaining the disclosed embodiments of the present invention in detail it is to be understood that the invention is not limited in its application to the details of the particular arrangements shown hereafter since the invention is capable of other embodiments. Also, the terminology used herein is for the purpose of description and not of limitation.

This invention provides a novel device structure according to the invention for the single cell gap transflective liquid crystal display. The invention enables the back light 22 to also traverse the reflective pixel twice, similar to the traversal of the ambient light 24 as is shown in FIG. 2 in the device embodying the invention. To achieve this goal, a slant reflector 26 is built in the path of the back light 22 to reflect the transmitted light to the reflective region so that the back light 22 and ambient light 24 follow similar paths.

A conventional transflective LCD with separate transmission and reflection pixels has a double cell gap in order to compensate the unmatched liquid crystal retardation, as shown in FIG. 3b. Due to the double cell gap structure, glass etching and an ITO (indium-tin-oxide) electrode coating on the transmission region are needed. Additionally, the liquid crystal alignment is disturbed near the edges of the two different cell gaps. Thus, a black matrix is used to cover that region. As a result, the light efficiency is reduced.

In this invention, one uses a single cell gap transflective LCD, as shown in FIGS. 2 and 3a. Since both the back light 22 and the ambient light 24 basically follow the same path, they both have high (approximately 100%) light modulation efficiency. Moreover, the response time of the reflection (R) and transmission (T) pixels is the same. The different color saturation problem that exists in the prior art will not appear in this novel structure. R 42 rays and T 44 rays both pass through the color filter 46 twice, as shown in FIG. 4, and have the same color saturation.

For the novel structure shown in FIG. 3a, only a single retardation film is needed, which is different from any prior art structure. By eliminating a $\lambda/4$ film, it reduces the cost and increases the light throughput.

Figure 5A:
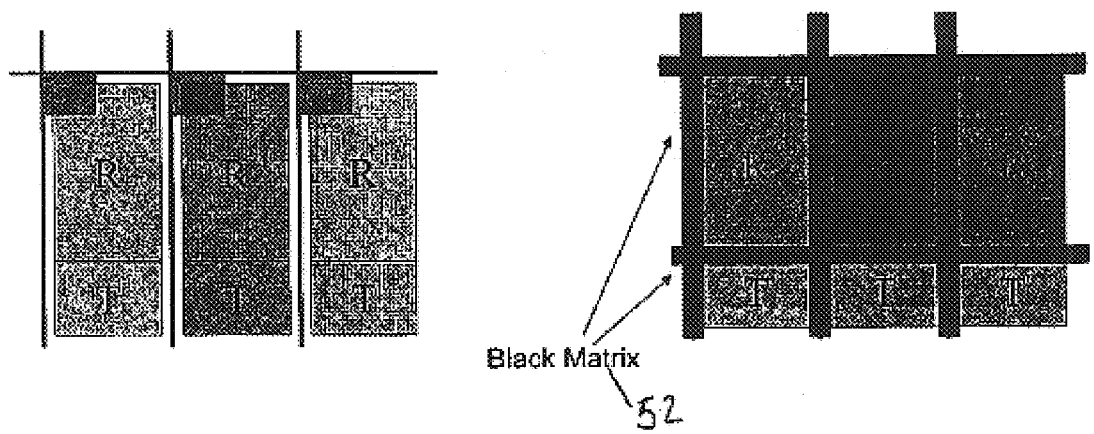
FIG. 5a is a prior art view of a double cell gap transflective LCD with a black matrix.
Figure 5B:
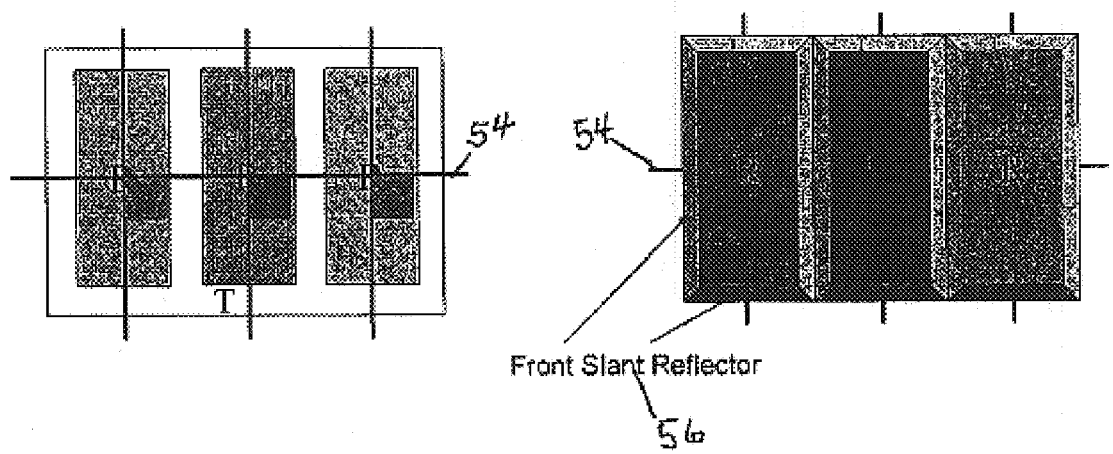
FIG. 5b shows a single gap transflective LCD of the invention with a front slant reflector without any black matrix.

In a conventional transflective LCD, the aperture ratio is approximately 85%, as shown in FIG. 5a, due to the black matrices 52 that are needed to cover the disclination lines. This invention utilizes a high area utilization structure to improve the brightness of the reflected and transmissive images. First of all, the Aluminum reflective layer covers the thin-film-transistors (TFT) and most of the metal electric wires 54, as shown in FIG. 5b. Secondly, the front slant reflector 56 at the space between each pixel, not only replaces the need for a black matrix but also increases the brightness of the transmitted images. Therefore, the reflection sub-pixels can be enlarged and display brightness improved.

Three different liquid crystal modes can be embodied into this invention:

1. The mixed-mode twisted nematic (MTN) cell with equivalent λ/4 phase retardation, for instance, the 750 MTN cell at β~15° (here β is the angle between the polarizer's axis and the front LC rubbing direction), or 80° MTN cell at β~20°. In this embodiment, a single λ/4 film and two polarizers are needed. Reference: Wu and Yang, "Reflective Liquid Crystal Displays" (Wiley-SID, 2001), Ch.4.

2. Homogeneous LC cell with λ/4 phase retardation. Here, a single λ/4 film and two polarizers are needed. Reference: Wu and Yang, "Reflective Liquid Crystal Displays" (Wiley-SID, 2001), Ch.3.

3. Vertical alignment LC cell with λ/4 phase retardation. In this embodiment, two λ/4 films and two polarizers are needed.

Figure 6A:
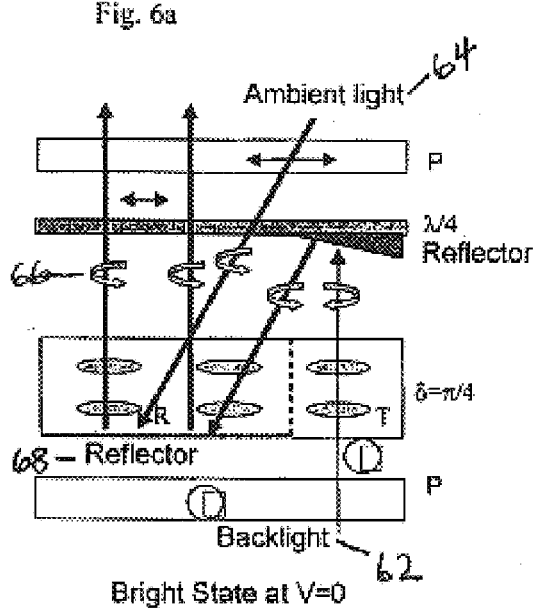
FIG. 6a shows a homogenous transflective LC cell with Bright State at V=0.
Figure 6B:
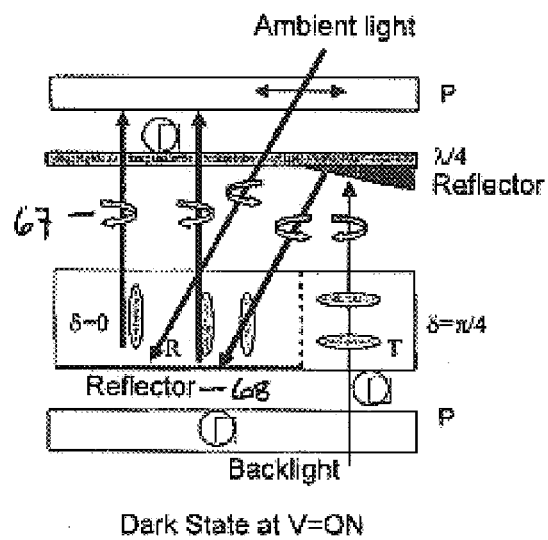

FIGS. 6a and 6b illustrate the operating principles of the novel transflective LCD of the invention employing a homogeneous LC cell as an example. The mixed-mode twisted nematic cell should have a higher contrast ratio and lower operating voltage. In the V=0 state (FIG. 6a), the polarization of the back light 62 and ambient light 64 are shown in each stage. Here, the half circle symbols represent the circular polarization. With the arrow 66 facing right, FIG. 6a (or arrow 67 left, FIG. 6b), they are right, FIG. 6a (or left FIG. 6b) handed circular polarization. When a right hand circularly polarized light is reflected by a reflector 68, its outgoing beam becomes left handed.

Figure 7A:
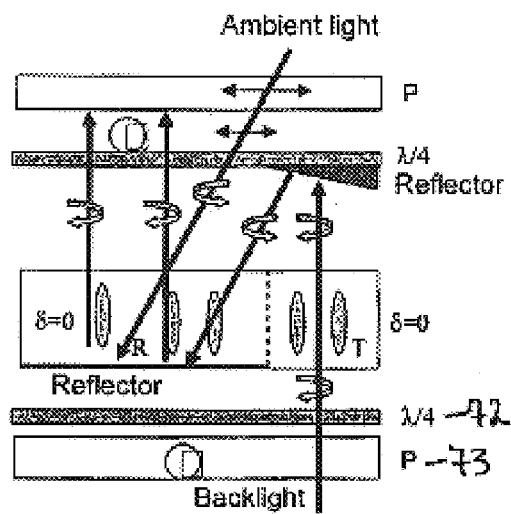
FIG. 7a shows a black transflective LCD of the invention employing a vertical alignment (VA) LC cell in Dark State at V=0.
Figure 7B:
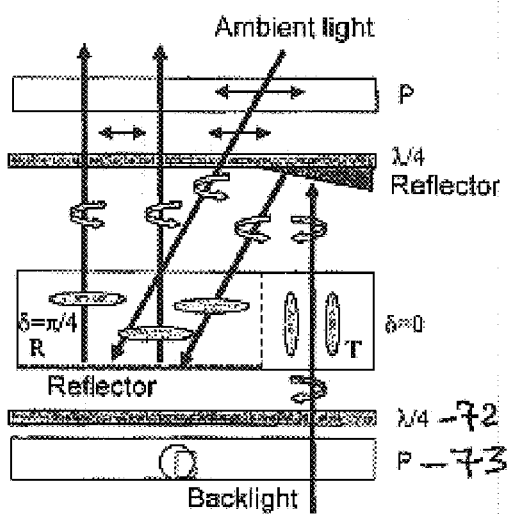

Similarly, FIGS. 7a and 7b depict a normally black mode using a vertical alignment LC cell. Note that another quarter-wave film 72 is added to the bottom polarizer 73. In the voltage-off state (FIG. 7a), the LC directors are perpendicular to the glass substrates. The effective phase retardation is λ=0. As a result, both ambient and back light are blocked by the crossed polarizers. In the voltage-ON state (FIG. 7b), the transmissive part of the cell remains unaffected because of no electrode. However, the reflective sub-pixel is activated. The effective phase retardation is λ/4 so that the light leaks through the crossed polarizer.

Slant Reflector on the Surface of Glass

Figure 8A:
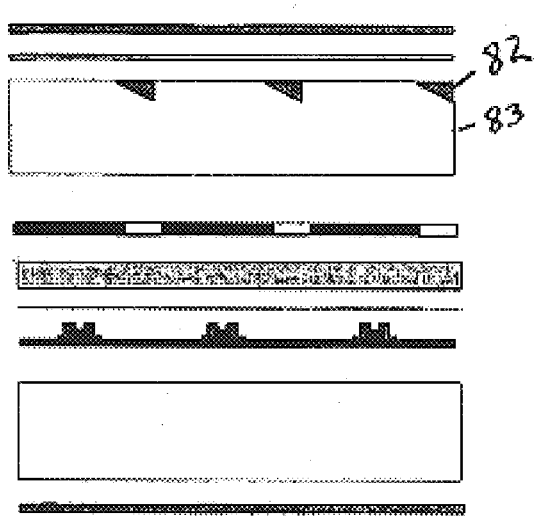
FIG. 8a shows an LCD structure with a slant reflector built on the front of the top glass.
Figure 8B:
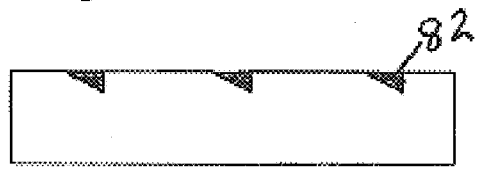
Figure 8C:
Figure 8D:
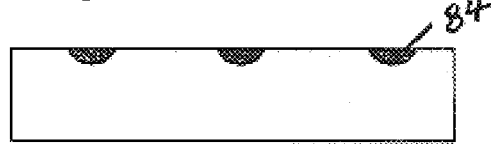
Figure 9A:
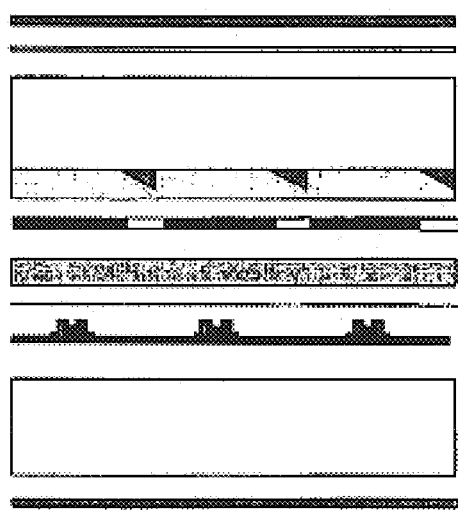
FIG. 9a shows the structure of the slant reflector on the backside of the top glass with a transparent covering layer.
Figure 9B:
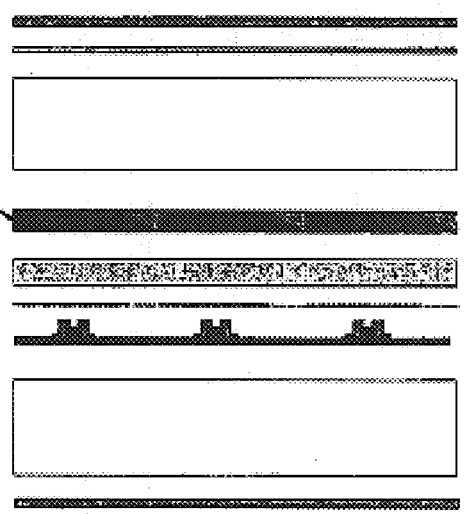
FIG. 9b shows the structure of the slant reflector on the backside of the top glass with a color filter.
Figure 10A:
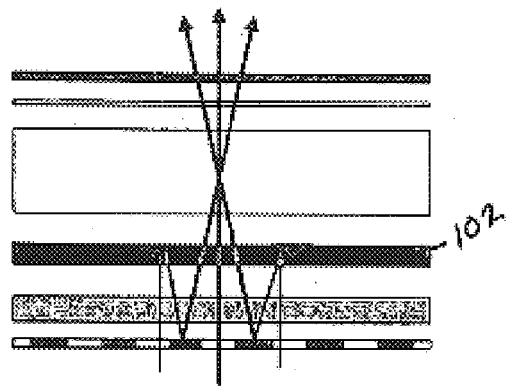
FIG. 10a shows a side view of the structure of the slant reflector on the backside of the top glass with transmission region of FIGS. 9a & 9b.
Figure 10B:
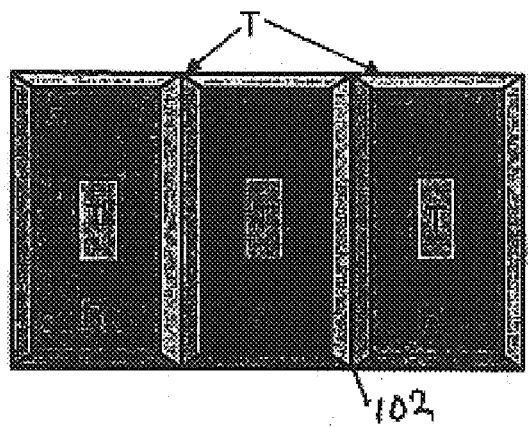
FIG. 10b shows a top view of the structure of the slant reflector on the backside of the top glass with transmission region of FIGS. 9a & 9b.

Referring to FIG. 8a, the slant reflector 82 can be built on the front surface of the glass 83. The shapes of reflectors can include triangular shapes 82 FIG. 8b, biprism shapes 83 FIG. 8c, and curvature shapes 84 FIG. 8d Slant Reflector on the Backside of Top Glass:

Referring to FIGS. 9a and 9b, the slant reflector can not only be built on the front surface of top glass but also on the backside of top glass. This structure can reduce the shadowing effect that might be caused by the slant reflector. A covering layer would be needed to fill up the gap of slant reflector and control the distance between slant reflector and the reflector at the bottom of liquid crystal layer. The covering layer can be either a transparent material 93 FIG. 9a or color filter 94 FIG. 9b Slant or flat Reflector on the back of top glass with transmission region:

Referring to FIGS. 10a and 10b, in this structure, the slant reflector 102 is still on the backside of the top glass to replace the black matrix as used in the prior art conventional panel, single or double cell gap. FIGS. 10a and 10b show the side view and top view, respectively of the slant reflector 102. Thus, the transmission brightness would be increased and a better optimized ratio of reflection and transmission region can be redefined.

EXAMPLES

The novel structures have been simulated by using an optical simulation program, named Advanced Systems Analysis Program (ASAP). The simulated examples are described in the following:

Example 1

The dimensions of the slant reflector on the front surface of top glass and the simulation parameters are listed in Table 1.

TABLE 1

| Parameters used for simulations. | |
|---|---|
| Glass thickness (μm) | 500 |
| LC cell gap thickness (μm) | 5 |
| Pixel size (μm) | 240 × 240 |
| Angle of Slant reflector (Degree) | 3 |
| Space between subpixel (μm) | 12 |
| Ratio of R:T | 4:1 |

Figure 11:
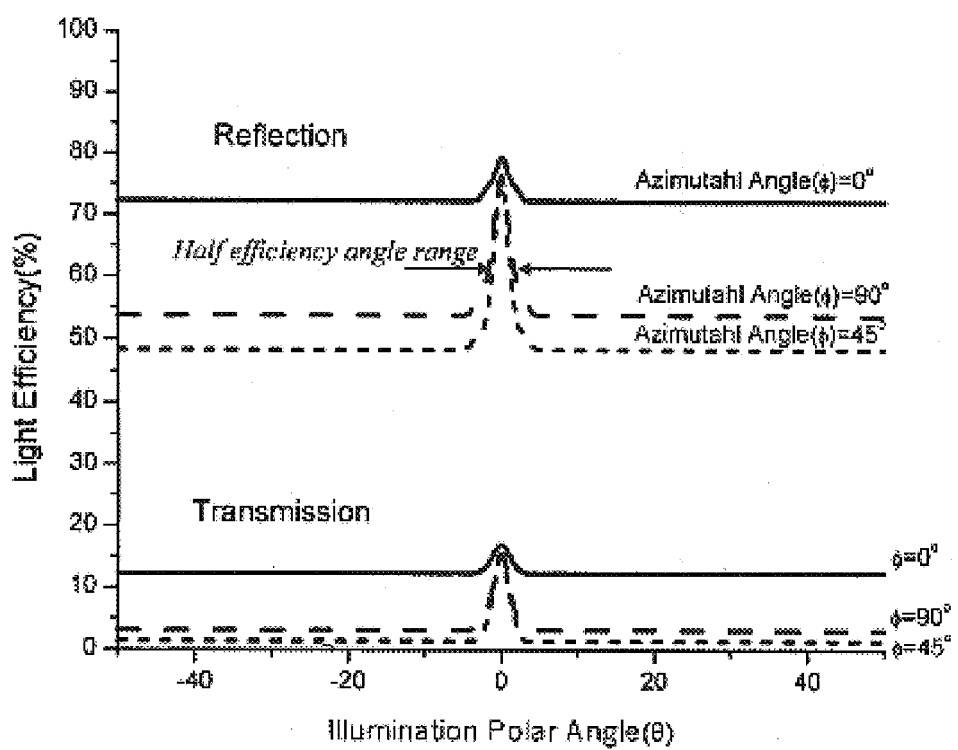
FIG. 11 shows the light efficiency of reflection and transmission with different illumination polar angles.

The simulation calculates the light efficiency of reflection and transmission with different illumination angles. As shown in FIG. 11, the highest reflection light efficiency is approximately 81% at normal incident (θ=0°, φ=0°), and the lowest is approximately 48.36% at azimuthal angle (φ) equals approximately 45° and polar angle (θ) larger than ±5°. In addition, the transmission light efficiency reaches approximately 17.62% for the normal incident backlight and is decreased to approximately 1.4% at (θ=±6°, φ=45°). The half efficiency angle range of reflection and transmission is approximately 3° and approximately 2.5°, separately.

Example 2

The slant reflector on the backside of top glass and the simulation parameters are shown hereafter in Table. 2. The distance between slant reflector to and the reflector at the bottom of liquid crystal layer is approximately 25 μm.

Figure 12:
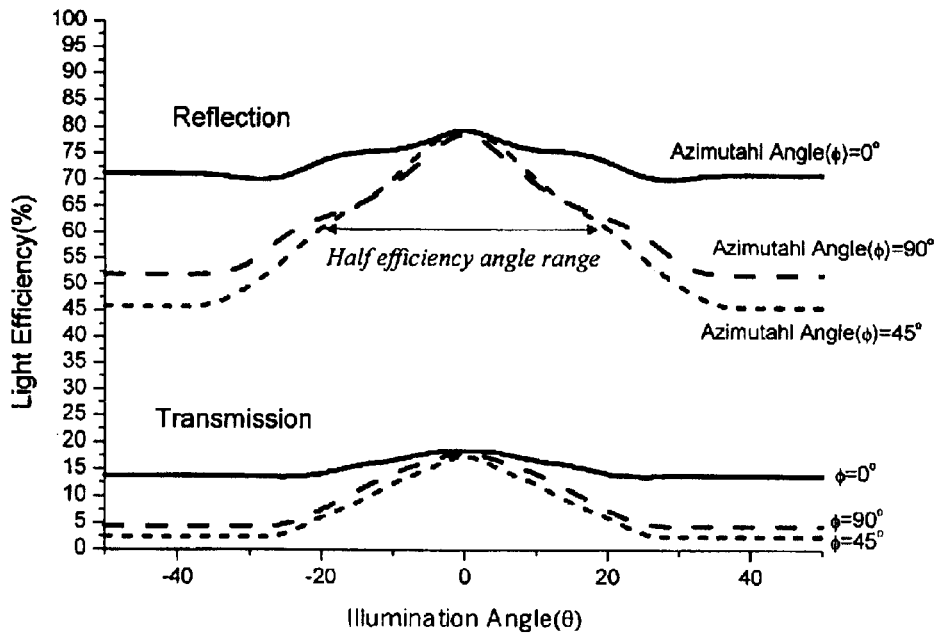
FIG. 12 shows the light efficiency of reflection and transmission with different illumination angles.

The simulation calculates the light efficiency of reflection and transmission with different illumination angles. As shown in FIG. 12 the highest reflection light efficiency is approximately 81% at normal incident (θ=0°, φ=0°), and the lowest is approximately 48.36% at azimuthal angle (φ) equals 45° and polar angle (θ) larger than approximately ±35°. In addition, the transmission light efficiency is approximately 17.62% for the normal incident backlight and is decreased to approximately 2.45% at (θ=approximately ±30°, φ=approximately 45°). The half efficiency angle range of reflection and transmission is approximately 30° and approximately 25°, separately.

TABLE 2

| Parameters used for simulations shown in FIG. 12. | |
|---|---|
| Glass thickness (μm) | 500 |
| LC cell gap thickness (μm) | 5 |
| Pixel size (μm) | 240 × 240 |
| Angle of Slant reflector (Degree) | 15 |
| Space between subpixel (μm) | 12 |
| Ratio of R:T | 4:1 |

Example 3

The slant reflector on the backside of top glass with various distance (D) between slant reflector and the reflector at the bottom of liquid crystal layer had been simulated. The parameters are the same as shown in Table 2. The average light efficiency of reflection and transmission had been calculated. The ambient light was assumed as illuminated from polar angle θ=0° to θ=45° and azimuthal angle φ=+45° to φ=−45°. The backlight was assumed as ±20° divergent angle. The simulated average efficiency is shown in Table 3.

TABLE 3

The calculated reflection and transmission efficiency for different D values.

| Average Light efficiency | Distance between slant reflector and bottom reflector | | | |
|---|---|---|---|---|
| | D = 25 μm | D = 15 μm | D = 10 μm | D = 5 μm |
| Reflection | 66.69% | 71.8% | 72.5% | 75.7% |
| Transmission | 14.9% | 13.7% | 12.69% | 9% |

Example 4

The reflective light of slant reflector would be oblique incident into the LC layer and might lower the light efficiency. Therefore, the modulated light phase retardation of LC layer has been calculated by following equations:

$$\Delta n \cdot d = (n_{eff} - n_o) \cdot d = \left( \frac{n_e n_o}{\sqrt{n_o^2 \cos^2\theta + n_e^2 \sin^2\theta}} - n_o \right) \cdot d$$

Here Δn·d=Optical retardation, $n_{eff}$=effective index of refraction, $n_o$=Ordinary index of refraction, d=liquid crystal cell gap, $n_e$=extraordinary index of refraction, and theta angle=Angle between incident light and optical axis of liquid crystal.

By determining phase retardation with a different slant angle, the light efficiency of liquid crystal at bright state can be calculated.

Figure 13A:
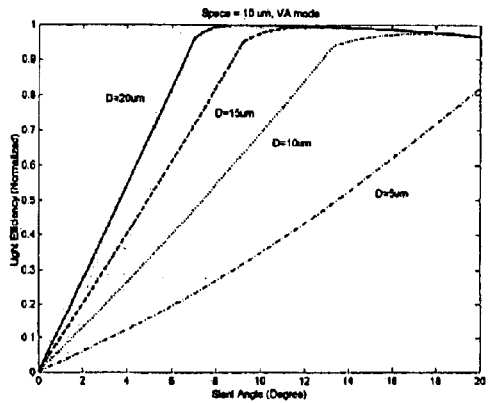
FIG. 13a is a plot of liquid crystal (LC) light efficiency of slant length at approximately 10 $\mu$m with the VA mode.
Figure 13B:
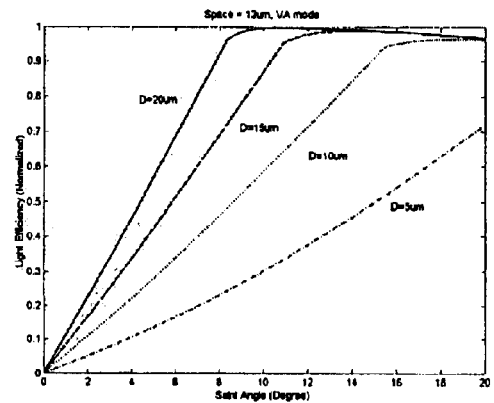
FIG. 13b is a plot of LC light efficiency of slant length at approximately 12 $\mu$m with the VA mode.
Figure 13C:
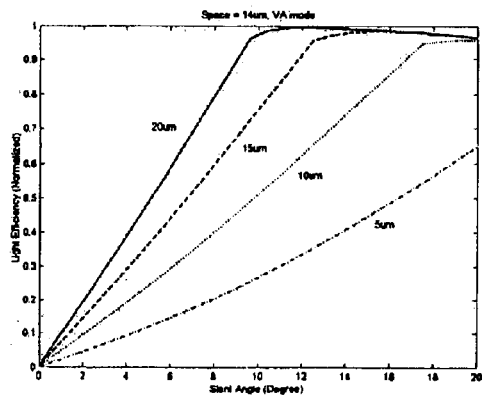
FIG. 13c is a plot of LC light efficiency of slant length at approximately 14 $\mu$m with the VA mode.
Figure 14A:
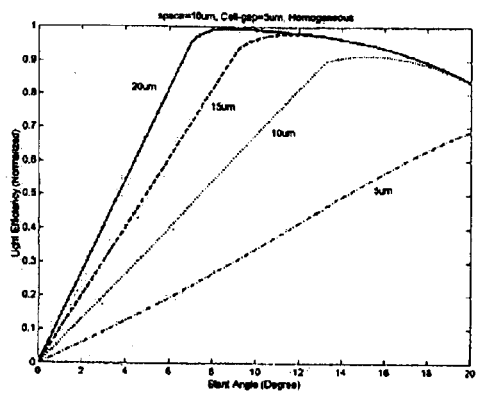
FIG. 14a is a plot of LC light efficiency of slant length at approximately 10 $\mu$m with homogenous mode.
Figure 14B:
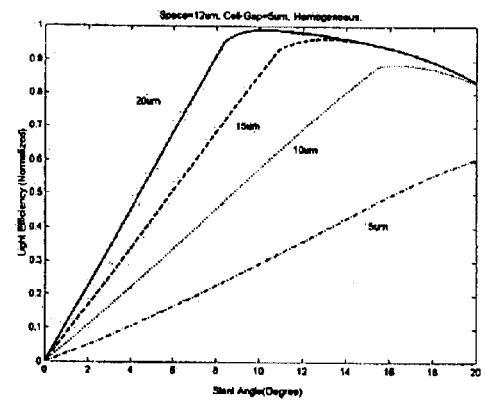
FIG. 14b is a plot of LC light efficiency of slant length at approximately 12 $\mu$m with homogenous mode.
Figure 14C:
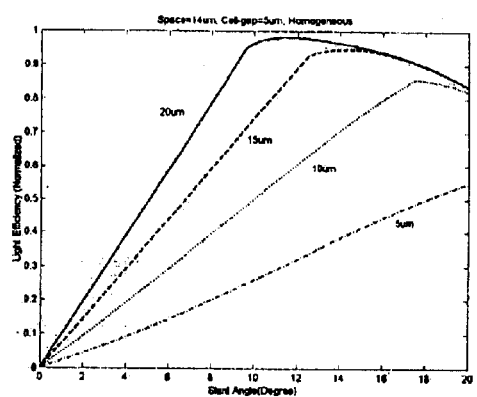
FIG. 14c is a plot of LC light efficiency of slant length at approximately 14 $\mu$m with homogenous mode.

In FIGS. 13 and 14, it shows the normalized light efficiency with various slant angles of VA and homogeneous mode, separately. The slant length of each plot in turns is approximately 10, approximately 12, and approximately 14 μm. Additionally, the distance from slant reflector to the bottom reflector had also been show in different line style of each plot.

The maximum light efficiency of different parameters are hereafter listed in Tables 4 and 5. However, if the best slant reflector angle was larger than approximately 15°, the reflective light angle would be larger than approximately 30°, which would not be the optimized angle of conventional bottom reflector, ex: bumping reflector. Thus, only the slant reflector angles less than approximately 15° are to be considered.

Example 5

Figure 15A:
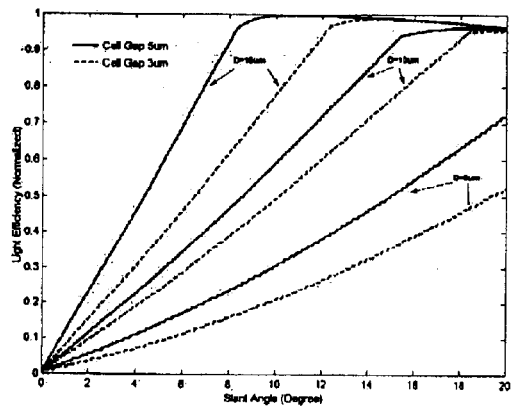
FIG. 15a shows LC efficiency of different LC cell gap thicknesses with VA.
Figure 15B:
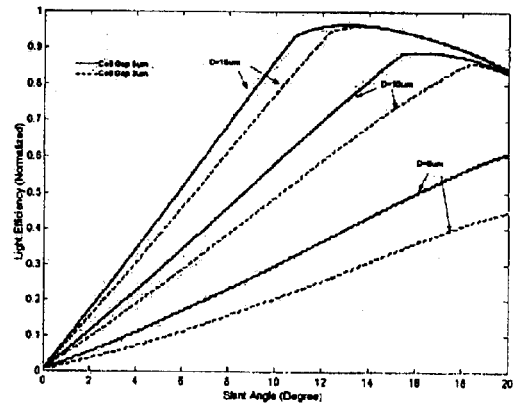
FIG. 15b shows LC efficiency of different LC cell gap thicknesses with homogenous mode.

The cell gap thickness of liquid crystal layer would also be an important issue of light efficiency. Therefore, a comparison of the light efficiency of cell gaps of approximately 3 μm and 5 μm with VA and homogeneous mode, separately, is shown in FIG. 15. The distance from slant reflector to the bottom reflector was again considered.

Example 6

Figure 16:
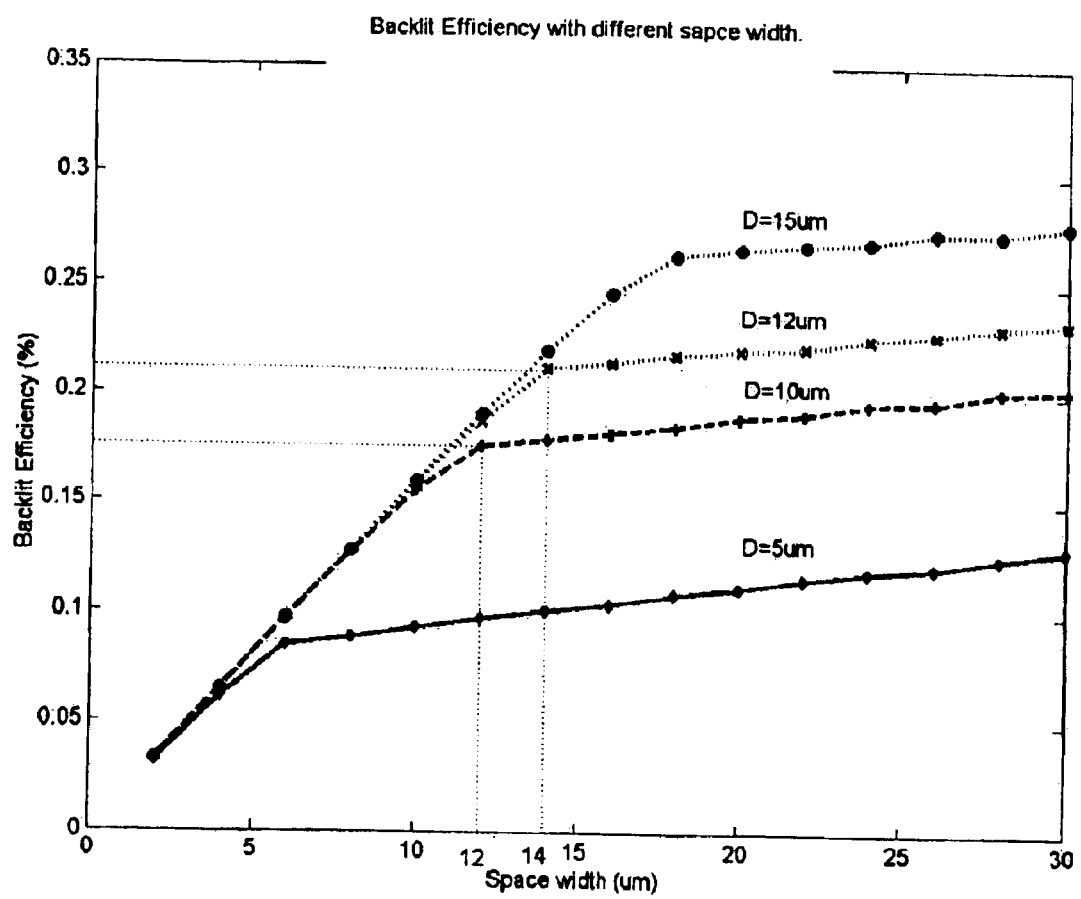
FIG. 16 shows simulated backlight transmissive efficiency with different slant length.

By combining the LC efficiency and the transmissive region ratio, the transmissive light efficiency is determined. As FIG. 16 shows, the transmissive efficiency would be almost saturated when the slant length increased. However, the increasing slant length would also shrink the reflective region. Thus, from the plot, the optimized slant length and distance from slant reflector to bottom reflector is defined.

Example 7

From above examples, one can combine the above results from ASAP, with the LC efficiency. The results are shown hereafter in Tables 4, 5 and 6 (latter shows composite results) as well as the comparative results of the conventional single and double cell gap display.

TABLE 4

The maximum LC efficiency of different parameters with VA mode.
VA

| | Max Efficiency | Max Angle |
|---|---|---|
| Space = 10 μm | | |
| D = 0 μm | 57.69% | 15 |
| D = 5 μm | 96% | 15 |
| D = 10 μm | 99.40% | 12.5 |
| D = 15 μm | 99.80% | 9 |
| Space = 12 μm | | |
| D = 0 μm | 50.60% | 15 |
| D = 5 μm | 91.40% | 15 |
| D = 10 μm | 98.90% | 14 |
| D = 15 μm | 99.70% | 10.5 |
| Space = 14 μm | | |
| D = 0 μm | 45.40% | 15 |
| D = 5 μm | 80.12% | 15 |
| D = 10 μm | 98.34% | 15 |
| D = 15 μm | 99.47% | 12 |

TABLE 5

The maximum LC efficiency of different parameters with homogenous mode.
Homogeneous

| | Max Efficiency | Max Angle |
|---|---|---|
| Space = 10 um | | |
| D = 0 μm | 53.30% | 15 |
| D = 5 μm | 92% | 15 |
| D = 10 μm | 96.40% | 13 |
| D = 15 μm | 98.90% | 10.3 |
| Space = 12 μm | | |
| D = 0 μm | 46.90% | 15 |
| D = 5 μm | 86.80% | 15 |
| D = 10 μm | 96.40% | 13 |
| D = 15 μm | 98.90% | 10.3 |
| Space = 14 μm | | |
| D = 0 μm | 42.00% | 15 |
| D = 5 μm | 75.60% | 15 |
| D = 10 μm | 94.60% | 13.9 |
| D = 15 μm | 98.20% | 11.5 |

TABLE 6

Comparision of the transmissive (T) and reflective (R) light efficiency of
this invention with the conventional transflective displays.

| Parameters | TYPE | | | | | | | | |
|---|---|---|---|---|---|---|---|---|---|
| | I | II | II | II | II | III-1 | III-2 | IV | V |
| Glass thickness (μm) | 500 | 500 | 500 | 500 | 500 | 500 | 500 | 500 | 500 |
| LC cell gap thickness (μm) | 5 | 5 | 5 | 5 | 5 | 5 | 5 | 5 | 5 |
| Pixel size (μm x μm) | 240 × 240 | 240 × 240 | 240 × 240 | 240 × 240 | 240 × 240 | 240 × 240 | 240 × 240 | 240 × 240 | 240 × 240 |
| Angle of Slant reflector (Degree) | 3 | 15 | 15 | 15 | 15 | 15 | 15 | X | X |
| Slant length (μm) | 12 | 12 | 12 | 14 | 14 | 12 | 12 | X | X |
| Distance from slant reflector to bottom reflector (μm) | 500 | 10 | 7 | 10 | 5 | 0 | 0 | X | X |
| Transmission efficiency (%) | 6.5% | 15.82% | 14.4% | 13.55% | 11.59% | 14.5% | 15.5% | 13.9% | 14.5% |
| Reflection efficiency (%) | 56.3% | 66.44% | 68.3% | 71.8% | 72.5% | 61.7% | 65.7% | 51.6% | 59.2% |
| Total efficiency (%) | 72.8% | 82.26% | 82.7% | 85.35% | 84.09% | 76.2% | 81.2% | 65.5% | 73.7% |
| Fabrication process level | 2 | 4 | 3 | 4 | 3 | 5 | 5 | 1 | 4 |

Simple 1 2 3 4 5 Complex

TYPE:
I: Slant Reflector on the front of top glass.
II: Slant Reflector on the backside of top glass
III-1: Slant Reflector on backside + Transmissive Region (Single cell gap)
III-2: Slant Reflector on backside + Transmissive Region (Double cell gap)
IV: Conventional single cell gap
V: Conventional Double cell gap The invention can have applications for handheld and mobile communications such as but not limited to mobile telephones, personal digital assistants (PDA), e-books, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An improved transflective liquid crystal display (LCD) comprising:
   (a) a transmission portion and a reflective portion in the transflective LCD; and,
   (b) means on the path of back light in the transmission portion to reflect transmitted light to the reflective portion so that the backlight and ambient light follow similar paths whereby brightness of the reflected and transmissive images are improved.

2. The transflective LCD of claim 1, wherein the transflective LCD includes:
   a single gap in both the transmission portion and in the reflective portion.

3. The transflective LCD of claim 1, wherein the path means includes:
   a reflector.

4. The transflective LCD of claim 3, wherein the reflector includes:
   a slanted reflector.

5. The transflective LCD of claim 3, wherein the reflector includes:
   a triangular shape.

6. The transflective LCD of claim 3, wherein the reflector includes:
   a biprism shape.

7. The transflective LCD of claim 3, wherein the reflector includes:
   a curvature shape.

8. The transflective LCD of claim 3, further comprising:
   a top glass with the reflector built on a front surface of the top glass.

9. The transflective LCD of claim 3, further comprising:
   a top glass with reflector built on a backside of the top glass.

10. The transflective LCD of claim 3, further comprising:
    a transparent covering layer material in a gap portion of the reflector.

11. The transflective LCD of claim 3, further comprising:
    a color filter covering material in a gap portion of the reflector.

12. A method of improving a transflective liquid crystal display comprising the steps of:
   (a) providing a transmission portion and a reflection portion in the transflective LCD; and,
   (b) means to reflect the path of back light in said transmission portion to said reflective portion whereby the reflected backlight and ambient light follow similar paths and thereby improve the brightness of the reflected and transmissive images of the transflective LCD are improved.

13. The method of claim 12, wherein the providing step further includes:
   providing a single gap in both the transmission portion and in the reflection portion.

14. The method of claim 12, wherein the step of reflecting further includes:
   positioning a reflector in the transmission portion.

15. The method of claim 14, wherein the positioning step further includes:
   positioning a slanted reflector in the transmission portion.

16. The method of claim 14, wherein the positioning step further includes:
   positioning a triangular shape reflector in the transmission portion.

17. The method of claim 14, wherein the positioning step further includes:
   positioning a biprism shape reflector in the transmission portion.

18. The method of claim 14, wherein the positioning step further includes:
   positioning a curvature shape reflector in the transmission portion.

19. The method of claim 14, wherein the positioning step further includes:
   positioning a top glass with the reflector built on a front surface of the top glass.

20. The method of claim 14, wherein the positioning step further includes:
   positioning a top glass with reflector built on a backside of the top glass.

21. The method of claim 14, further comprising the step of:
   applying a transparent covering layer material in a gap portion of the reflector.

22. The method of claim 14, further comprising the step of:
   applying a color filter covering material in a gap portion of the reflector.

* * * * *